A. STAMM.
FASTENING DEVICE.
APPLICATION FILED JAN. 17, 1917.

1,255,240. Patented Feb. 5, 1918.

INVENTOR
August Stamm
BY Earl P. Coefel.
ATTORNEY

UNITED STATES PATENT OFFICE.

AUGUST STAMM, OF NEW YORK, N. Y.

FASTENING DEVICE.

1,255,240.  Specification of Letters Patent.  Patented Feb. 5, 1918.

Application filed January 17, 1917.  Serial No. 142,780.

*To all whom it may concern:*

Be it known that I, AUGUST STAMM, a citizen of the United States, and resident of the borough of Manhattan, in the city and State of New York, have invented certain new and useful Improvements in Fastening Devices, of which the following is a specification.

The present invention relates to improvements in fastening devices, and particularly such devices for the fastening of waist bands, belts or the like. An object of the invention is to provide such a device which will permit the band or belt or the like to be fastened in a relatively tight manner, requiring very little effort.

With the ordinary fasteners in use, it is necessary to pull the two portions of the fastener toward each other very tightly, and to fasten the same when so pulled, the belt or band when fastened being no tighter than when pulled prior to fastening the fastener, and this operation very often resulted in breaking or injuring the finger nails. With the present invention it is intended to obviate these difficulties and provide a fastener which will be both easy to operate, and positive in locking action, precluding any danger of the same becoming accidentally unfastened, and permitting the belt first to be fastened in an untightened position, and then tightened by merely throwing or swinging over one portion of the fastener, requiring very little effort. A further object is to provide such a device which is simple in constuction, each of the two members thereof being preferably stamped from a single piece of metal.

With these and other objects in view, an embodiment of my invention is shown in the accompanying drawings, and this embodiment will be hereinafter more fully described with reference thereto, and the invention will be finally pointed out in the claims.

Figure 1:
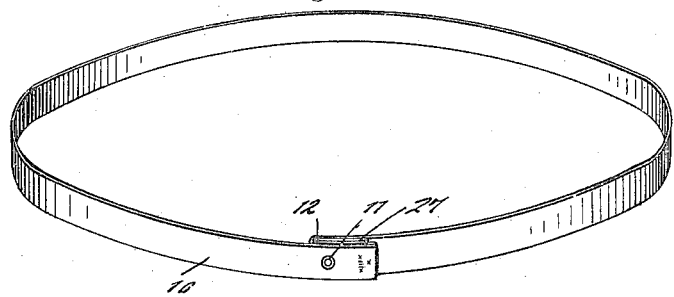
Figure 2:
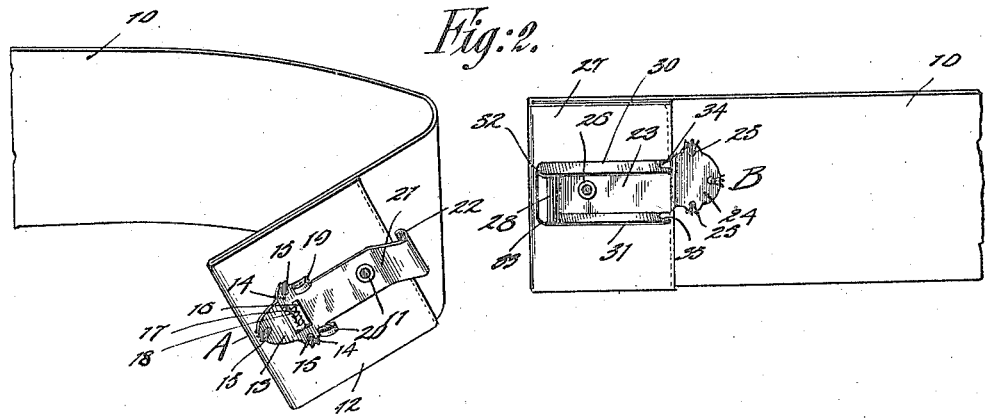
Figure 3:
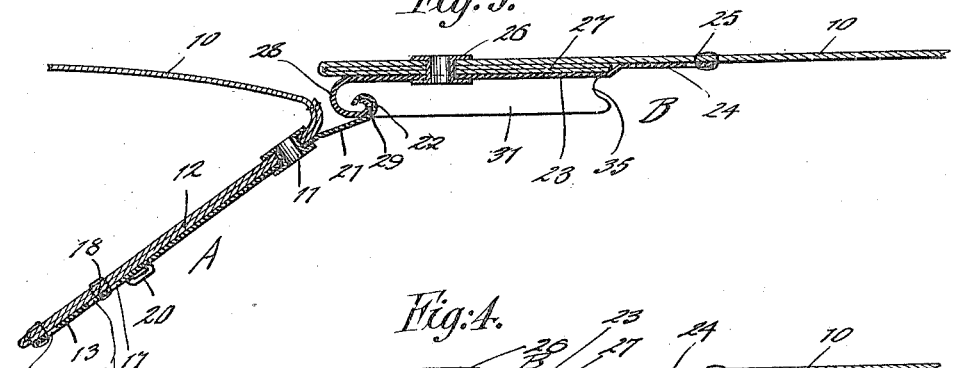
Figure 4:
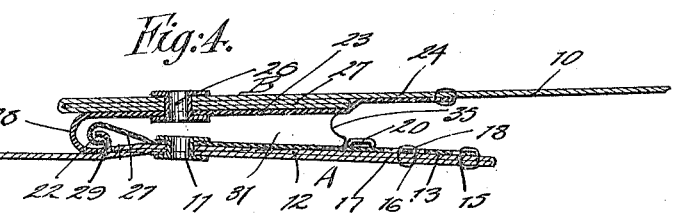
Figure 5:
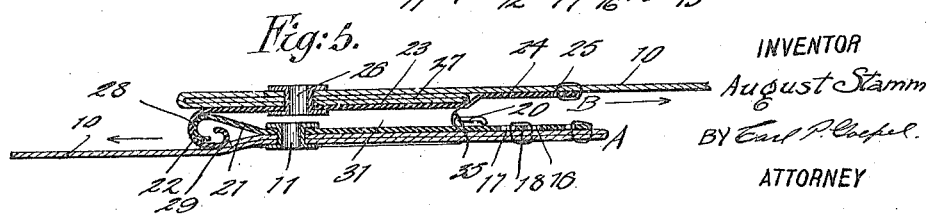

In the accompanying drawings,

Figure 1 is a perspective view of a belt or band, provided with an embodiment of my invention, Fig. 2 is an enlarged perspective view, showing the two portions of the fastener detached from each other, and Figs. 3, 4 and 5 are longitudinal sectional views showing the three positions or stages of fastening the device, Fig. 3 showing the two portions hooked together, the belt being loose, Fig. 4 showing one portion of the fastener swung over into engagement with the other portion, tightening the belt, and Fig. 5 showing the locked position.

Similar reference characters indicate corresponding parts throughout the several figures of the drawings.

Referring to the drawings, the belt or band 10 has secured thereto at each end, one of the two members constituting my invention. In the embodiment of my invention illustrated in the drawings, the member A is preferably formed of one piece of metal, and is secured to the under side of one end of the belt or band, by means of an eyelet 11, the said belt or band being preferably folded over as at 12 to reinforce the same.

The general shape of the member A shown in the embodiment, is rectangular, but said member may of course be of any other suitable shape, and the outer portion 13 is provided with projecting lugs 14 having eyelets 15 therein for securing the fastener member A to the belt by means of sewing. To further secure the same, elongated openings 16 and 17 are provided adjacent each other, forming an intermediate bar 18, by means of which the member A may be sewed to the belt.

Shoulders 19 and 20 are provided on the enlarged end 13 at each side of the body portion of the member A, said shoulders being formed by first having the enlarged portion extend for a short distance along the body portion and splitting this extending portion, and folding the same backwardly upon the enlarged portion. These shoulders, it will be understood, however, may be formed in any other suitable manner. The inner portion of the member A is bent away from the belt as at 21, and is provided at its end with a hook 22 bent toward the belt and terminating outwardly toward the free or outer end portion 13.

The member B comprises a main portion 23, provided at one end with an enlarged extension 24, having holes 25 therein for sewing the member to the belt, the portion 23 of the said member being secured to the belt by means of an eyelet 26. The belt is preferably folded as at 27 to reinforce the same, and the portion 24 may be slightly off-set from the portion 23 so that the member B may lie flatly against the belt. The outer end of the said member B is provided with a rounded portion 28 extending over a relatively short distance over the portion 23, provided at its extremity with a hook portion 29 bent away from the belt and having its end facing inwardly, that is, away from the free or outer end of the belt portion to which member B is attached. The hook portion 29 forms a hasp or pintle. Upwardly extending sides 30 and 31 are provided at each side of the portion 33, being preferably formed from the same piece of metal, and bent upwardly from the said portion, the outer ends of the said side portions being rounded as at 32 and 33 to conform to the portion 28, and the inner ends being recessed as at 34 and 35. The distance between the said recessed portion and the inner surface of the rounded portion 28 is either slightly greater than, or equal to, the distance between the outer surface of the hook portion 22 and the shoulders 19 and 20 of the member A.

In operation the hook portion 22 of the member A is first engaged over the hooked end 29 of the rounded portion 28 of the member B, as shown in Fig. 3. In this position it will be noted that the members are held in engagement with each other, and the belt itself is loose, the eyelet 11 of the member A being disposed at a substantial distance from the hook portion 22 for this purpose. The outstanding end of the member A is then grasped and forced toward the member B, thereby drawing the eyelet portion 11 and the end of the belt toward the other end of the belt, tightening the same until the shoulders 19 and 20 ride over the ends of the sides 30 and 31 (Fig. 4) and engage the recessed portions 34 and 35 (Fig. 5). The belt is now tightened and exerts a force in each direction from the fastener, as indicated by the arrow lines, and thereby holds the fastener positively hooked, and any strain upon the same will tend to make the fastening more secure rather than to endanger its security as in the ordinary form of fasteners.

Fig. 5 illustrates the hooked position in which the shoulders engage the recessed portions. It will be understood that the shape of the fastener may be modified and any other fastening means may be employed than the eyelets, and that the parts of the same may be modified to meet any demands desired.

I have illustrated a preferred and satisfactory embodiment of my invention, but it is obvious that changes may be made therein within the spirit and scope thereof, as defined in the appended claims.

I claim:

1. A fastener of the character described, comprising a pair of members, a hasp at one end of one of said members, a hook at one end of the other of said members, the free end of said hook extending toward the opposite end of said member containing the same, said hook adapted to be engaged with said hasp to permit swinging of one of said members about the other, said hook and hasp adapted to maintain hooked connection of said members through an angle of movement of more than ninety degrees, and coöperating fastening means provided on said members at a distance from the ends thereof containing said hook and hasp.

2. A fastener of the character described, comprising a pair of members, a hasp at one end of one of said members, a hook at one end of the other of said members, the free end of said hook extending toward the opposite end of said member containing the same, said hook adapted to be engaged with said hasp to permit swinging of one of said members about the other, from a position at which said members are disposed substantially parallel to each other and end to end, to a position substantially parallel to each other and superimposed, said hook and hasp adapted to maintain hooked engagement throughout said swinging movement, and coöperating fastening means provided on said members at a distance from the ends thereof containing said hook and hasp.

3. A fastener of the character described, comprising a pair of members, a hasp at one end of said members, a hook at one end of the other of said members, the free end of said hook extending toward the opposite end of said member containing the same, said hook adapted to be engaged with said hasp to permit swinging of one of said members about the other, said hook and hasp adapted to maintain hooked connection of said members through an angle of movement of more than ninety degrees, and coöperating hooking means provided respectively on said members at a distance from the ends thereof containing said hook and hasp, said hook and hasp permitting a slight lateral movement of said members to engage said hooking means with each other.

4. The combination with a flexible elongated member, of a fastener comprising a pair of members secured respectively to the ends of said elongated member, hooking means on the end of one of said members adjacent the end of said elongated member, hooking means on the end of the other of said members removed from the end of said elongated member, said elongated member being free from a point on said last mentioned member substantially removed from said hooking means, the free end of one of said hooking means extending toward the opposite end of the member containing the same, said hooking means adapted to be engaged with each other to permit swinging of one of said members about the other, and adapted to maintain hooked connection of said members through an angle of movement of more than ninety degrees, and coöperating fastening means provided on said members at a distance from the end thereof containing said hooking means.

In testimony that I claim the foregoing as my invention, I have signed my name in presence of two subscribing witnesses.

AUGUST STAMM.

Witnesses:
D. LEWIS MATTERN,
MOE. M. WEINBERG.

Copies of this patent may be obtained for five cents each, by addressing the "Commissioner of Patents. Washington, D. C."